United States Patent
Buwalda et al.

(10) Patent No.: US 10,723,922 B2
(45) Date of Patent: Jul. 28, 2020

(54) STARCH-BASED AQUEOUS ADHESIVE COMPOSITIONS AND USES THEREOF

(71) Applicant: Coöperatie AVEBE U.A., Veendam (NL)

(72) Inventors: Pieter Lykle Buwalda, Groningen (NL); Anna Maria Dijk-van Delden, Leek (NL); Anne Margriet Hofman-de Dreu, Muntendam (NL)

(73) Assignee: COÖPERATIE AVEBE U.A., Veendam (NL)

( * ) Notice: Subject to any disclaimer, the term of this patent is extended or adjusted under 35 U.S.C. 154(b) by 0 days.

(21) Appl. No.: 16/539,584

(22) Filed: Aug. 13, 2019

(65) Prior Publication Data
US 2020/0040233 A1 Feb. 6, 2020

Related U.S. Application Data

(62) Division of application No. 14/896,971, filed as application No. PCT/NL2014/050382 on Jun. 12, 2014, now Pat. No. 10,526,514.

(30) Foreign Application Priority Data

Jun. 13, 2013 (EP) .................................... 13171819

(51) Int. Cl.
*C09J 103/04* (2006.01)
*C08B 30/12* (2006.01)
(Continued)

(52) U.S. Cl.
CPC .............. *C09J 103/04* (2013.01); *B32B 7/12* (2013.01); *B32B 17/06* (2013.01); *B32B 21/04* (2013.01);
(Continued)

(58) Field of Classification Search
None
See application file for complete search history.

(56) References Cited

U.S. PATENT DOCUMENTS 3,081,183 A * 3/1963 Roscelli .................... C08L 3/00
106/162.81
3,096,293 A * 7/1963 Jeanes ...................... C08B 3/22
106/217.7
(Continued)

FOREIGN PATENT DOCUMENTS

EP 0690170 A1 3/1996
WO 2014200344 A1 12/2014

OTHER PUBLICATIONS

Pauchard, L., et al., "On the effects of Non-Newtonian fluids above the ribbing instability", pp. 1-6.
(Continued)

*Primary Examiner* — Peter A Salamon
(74) *Attorney, Agent, or Firm* — Hoffman & Baron, LLP

(57) ABSTRACT

The invention relates to starch-based aqueous adhesive compositions and uses thereof. Provided is an aqueous adhesive composition comprising highly branched starch (HBS) obtained by treatment of starch or starch derivatives with a glycogen branching enzyme, and further comprising a carboxymethyl (CM) polysaccharide derivative, such as a carboxymethyl ether of starch, cellulose or a combination thereof. Also provided is a method for adhering a first substrate to a second substrate, comprising applying to at least said first or said second substrate said starch-based adhesive, and a glued or glueable product obtainable thereby.

5 Claims, 3 Drawing Sheets

Figure 1:
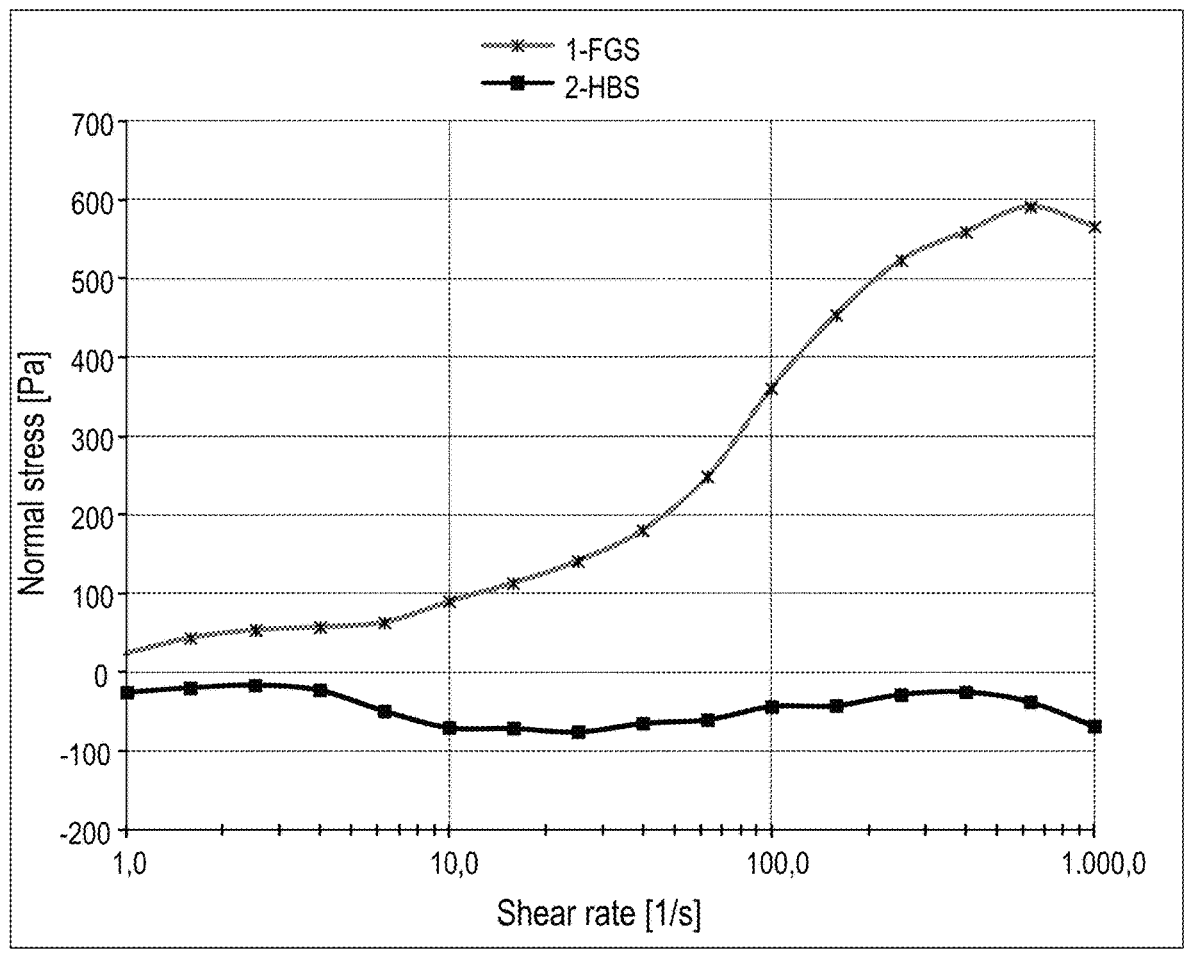

(51) Int. Cl.
*C08B 31/00* (2006.01)
*C09J 103/02* (2006.01)
*C08L 3/08* (2006.01)
*C08L 1/28* (2006.01)
*B32B 7/12* (2006.01)
*B32B 17/06* (2006.01)
*B32B 21/04* (2006.01)
*B32B 29/00* (2006.01)
*B32B 37/12* (2006.01)
*C09J 101/28* (2006.01)

(52) U.S. Cl.
CPC ............ B32B 29/002 (2013.01); B32B 37/12 (2013.01); C08B 30/12 (2013.01); C08B 31/00 (2013.01); C08L 1/286 (2013.01); C08L 3/08 (2013.01); C09J 101/284 (2013.01); C09J 103/02 (2013.01); *B32B 2255/08* (2013.01); *B32B 2255/12* (2013.01); *B32B 2255/26* (2013.01); *B32B 2315/08* (2013.01); *B32B 2317/12* (2013.01); *B32B 2317/16* (2013.01); *B32B 2439/70* (2013.01)

(56) References Cited

U.S. PATENT DOCUMENTS

| | | | | |
|---|---|---|---|---|
| 4,016,354 A * | 4/1977 | Greenwood | ............ | C08B 31/12 536/111 |
| 4,272,295 A * | 6/1981 | Linke | ............ | C09J 103/02 106/145.1 |
| 4,880,702 A * | 11/1989 | Homan | ............ | A61C 13/0025 106/35 |
| 5,143,966 A * | 9/1992 | Lee | ............ | C08F 218/08 524/459 |
| 5,424,302 A * | 6/1995 | Nitsch | ............ | C08B 30/12 435/173.1 |
| 5,696,072 A * | 12/1997 | Nercissiantz | ............ | C09D 9/00 510/202 |
| 5,856,467 A * | 1/1999 | Hofvander | ............ | A01H 5/04 536/102 |
| 6,107,432 A * | 8/2000 | Engelhardt | ............ | A61L 15/60 527/311 |
| 2001/0004442 A1* | 6/2001 | Elliott-Moore | ........ | B01D 61/06 417/225 |
| 2009/0022872 A1* | 12/2009 | Nishimoto et al. | ............ | 426/661 |
| 2010/0305033 A1* | 12/2010 | Hacket et al. | ................ | 514/5.4 |
| 2012/0121873 A1* | 5/2012 | Mann | ............ | C09J 103/00 428/211.1 |
| 2015/0197891 A1* | 7/2015 | van der Maarel | ... | C09D 103/04 428/533 |
| 2016/0130479 A1* | 5/2016 | Buwalda | ................ | C08L 1/286 428/438 |

OTHER PUBLICATIONS

Thiemann, Volker et al., "Heterologous expression and characterization of a novel branching enzyme from the thermoalkaliphilic anaerobic bacterium *Anaerobranca gottschalkii*," Appl Microbial Biotechnol (2006), 72: 60-71.

Sim, Hoon Goo et al., "Large amplitude oscillatory shear behavior of complex fluids investigated by a network model: a guideline for classification," Journal of Non-Newtonian Fluid Mechanics, 112 (2003), 237-250.

Fales, Frank W., "The Assimilation and Degradation of Carbohydrates by Yeast Cells," J. Biol. Chem. 1951, 193:113-124.

Palomo, M., et al., "The Unique Branching Patterns of Deinococcus Glycogen Branching Enzymes Are Determined by Their N-Terminal Domains," Applied and Environmental Microbiology, Mar. 2009, vol. 75, No. 5, p. 1355-1362.

Coutinho, Marcio da Silva et al., "Rheological and Morphological Properties of Carboxymethylcellulose/Starch Blends with or without ZnO and Their Applications as Inoculant Carrier," Macromol. Symp. 2012, 319, 222-229.

\* cited by examiner

STARCH-BASED AQUEOUS ADHESIVE COMPOSITIONS AND USES THEREOF

This application is a divisional application of U.S. application Ser. No. 14/896,971, filed on Dec. 9, 2015, which is the U.S. National Phase Entry of, and Applicants claim priority to International Patent Application Number PCT/NL2014/050382 filed Jun. 12, 2014, which claims priority from EP 13171819.9 filed Jun. 13, 2013, each of which is incorporated herein by reference.

The invention relates to aqueous adhesive compositions comprising a starch. Aqueous dispersion adhesives consist of solid adhesive dispersed in an aqueous phase. These adhesives contain water soluble additives such as surfactants, emulsifiers, and protective colloids that act as links between the apolar adhesive particles and the aqueous phase. They prevent the adhesive particles from sticking together and coagulation during storage. On drying, these additives evaporate or are absorbed into the adhesive film. In order to obtain optimum strength and performance, the adhesive must be completely dry. Small amounts of residual moisture combined with residual water soluble additives weaken the film and lower the resistance to moisture and water. These adhesives are well suited for automated assembly of wide area laminates consisting of water permeable substrates such as paper to paper, paper to wood and paper to board, wood veneer to wood or wood composite. Dispersion adhesives are prominent in the production of paper and board packages. Of these, so-called homopolymeric polyvinyl acetate (PVAc) dispersions are widely used and have been established for many years in the industrial bonding of paper. The formulations usually contain a plasticizer such as diisobutyl phthalate (DIBP), so that the adhesive can form an elastic film on paper. Although there are as yet no scientifically based limit values for assessing the transfer of DIBP to foods, DIBP is similar in terms of structure and action to the substance di-n-butyl phthalate (DnBP), which is considered to be toxic to reproduction, i.e. capable of causing harm to fetuses and impair fertility. The latest reports on DIBP, which can migrate from paper and board packages and accumulate in the packaged foods, have alerted food and packaging manufacturers. The plasticizer can come from sources such as dispersion adhesives, which are frequently used in the packaging industry.

For some time now, a steady increase in DIBP levels in food packages has been observed, although the latter are produced with DIBP-free adhesives. The cause of this is the combined recycling of food packages with non-food packages and other paper products processed with adhesives containing DIBP. DIBP is thus entrained into the overall paper cycle and accumulates in the fibers of recycled paper, from which new food packages are also manufactured. Extracting DIBP from the production processes in paper mills is technically impossible.

In the packaging industry, the interest in alternative adhesives is enormous.

After announcement of the possible risks caused by the migration of DIBP from dispersion adhesives in recycled paper, the existing adhesives formulations for packages were first changed over to safe plasticizers. In addition, there was a trend towards other types of dispersions such as VAE (Vinyl acetate/ethylene) copolymers making it possible to get rid of the plasticizer. See for example U.S. Pat. No. 5,143,966. The VAE dispersions' film formation capabilities mean that film-forming aids also become redundant in the formulation of adhesives. Whereas this new product line could be particularly interesting for developing plasticizer-free, aqueous adhesives for the paper and packaging industry, VAE-based dispersions are seldom chosen and only used for higher demands due to comparatively high costs. Furthermore, it appears that they have a lower wet tack which can be improved using boric acid but this is also undesirable due to legislation on hazardous compounds in particular on carcinogenic, mutagenic and reprotoxic chemicals (CMR legislation).

The production speed of machinery used in the paper industry, e.g. paper sack or laminating machines, increases all the time, so demand for high quality adhesives also grows. Stable adhesive viscosity is a key parameter in paper sack manufacture. Reduced drying time can be an issue when storage capacity is limited. Shorter delivery time is possible when paper sacks dry fast. The use of highly porous paper demands the right adhesives solution. Low splashing at high machine speeds is essential for many applications.

Starch- and dextrin-based adhesives play a large part in industrial production, especially the packaging industry. Starch and dextrin are principally used for bonding paper products. Most corrugated boxboard for making cartons is bonded with starch-based adhesives, and other porous substrates can be easily joined with these versatile adhesives. Starch and dextrin adhesives are readily available, low in cost, and easy to apply from water dispersion. They are considered to be one of the least expensive class of paper-packaging adhesive. Formulated starch and dextrin adhesives can be applied hot or cold. These adhesives are generally supplied as powder and mixed with water prior to use to form a liquid adhesive solution. Starch and dextrin cure by the loss of moisture.

US2012/0121873 (also published as EP2455436-A1) relates to starch-based glue compositions obtained by enzymatic modification of starch with a branching enzyme. The branched starch is said to confer a high long-term stability to a glue composition in liquid or aqueous form. Also, the starch-based glue would have a low viscosity and a high adhesive strength.

However, the present inventors observed that the glue compositions comprising enzymatically branched starch originating from e.g. potato, waxy potato, maize, waxy maize, wheat, tapioca, sago, pea, mungbean suffer from severe practical limitations. In particular, it was found that the glue compositions according to US2012/0121873 have undesirable Newtonian rheological properties, indicating that the viscosity is independent of the shear rate. In contrast, for many commercially important gluing applications it is preferred that the glue composition exhibits non-Newtonian shear thinning (also referred to as pseudoplastic) characteristics wherein the apparent viscosity decreases with an increasing rate of shear stress. For example, when shear thinning glues are applied the shear created by the brush or roller will allow them to thin and wet out the surface evenly. Once applied, the glues regain their higher viscosity which avoids drips and excessive penetration in the substrate There therefore remains a need for a starch-based adhesive composition which makes more effective use of the starch employed in its preparation, which is easy to prepare, of which the viscosity is stable, be easy to predict and control, and which exhibits a shear-thinning rheology behaviour. Preferably, such adhesive composition would also contain less plasticizer and other non-food grade ingredients as compared to existing shear-thinning glue compositions.

The present inventors therefore set out to develop an improved adhesive composition which overcomes at least part of the drawbacks of known plasticizer-free adhesives. In particular, they sought to provide a starch-based adhesive which not only meets the industrial requirements for the bonding of paper sacks, folding boxes, corrugated board boxes and paper packages, including large-area lamination but which is also is economically attractive, in particular in comparison with known plasticizer-free adhesives and which has advantageous rheological properties.

It was surprisingly found that at least some of the above goals can be met by the use of a starch derivative obtained by enzymatic treatment of starch with branching enzyme and a carboxymethylated polysaccharide as rheology modifier. The combination of the branched starch and a carboxymethylated polysaccharide conferred a number of unexpected desirable functional properties to the adhesive: transparent appearance (note: depending on the type of rheological modifier), shear-thinning behaviour, a high dry solids content, a fast setting speed, a high wet tack, a good viscostability (no retrogradation) and low misting/splashing. Importantly, this makes it unique among starch derivatives to be used in adhesives and comparable to PVAc based adhesives. Herewith, the invention provides an attractive plasticizer-free alternative for polyvinylacetate (PVAc)-based adhesives.

Therefore, in one embodiment the invention provides an aqueous adhesive composition comprising highly branched starch (HBS) obtained by treatment of starch or starch derivatives with a glycogen branching enzyme (EC 2.4.1.18), and further comprising a carboxymethyl (CM) polysaccharide derivative.

Numerous other polysaccharide derivatives were tested but found to be incompatible with HBS and/or did not confer the desired shear-thinning characteristics. This underscores the unexpected and unique finding that carboxymethylated derivatives are able to confer, at low dosages, a shear thinning behaviour to HBS without having a negative impact on the adhesive properties (e.g. wet tack, setting time, viscosity stability) of the HBS-based composition. Also, the anionic character of the polysaccharides was not sufficient, since the combination of HBS and oxidized starch resulted in a composition displaying Newtonian behaviour.

Whereas US2012/0121873 generally teaches the optional use of conventional admixtures, fillers and additives including rheology modifying additives, it is totally silent about starch-based rheology modifiers and carboxymethylated polysaccharides.

U.S. Pat. No. 4,272,295 discloses an aqueous adhesive composition comprising fully gelatinized starch and carboxymethyl cellulose. As is demonstrated herein below (Example 7), the use of HBS instead of fully gelatinized starch has unexpected effects on the rheological properties of adhesive composition. More specifically, the HBS-containing adhesive displayed a gel-like character much sought for in the paper and packaging industry.

As used herein, a carboxymethylated polysaccharide refers to a polysaccharide wherein carboxymethyl groups (—$CH_2$—COOH) are bound to some of the hydroxyl groups of the saccharide monomers that make up the polysaccharide backbone. Polysaccharides are long carbohydrate molecules of monosaccharide units joined together by glycosidic bonds. They range in structure from linear to highly branched. Polysaccharides are often quite heterogeneous, containing slight modifications of the repeating unit. Depending on the structure, these macromolecules can have distinct properties from their monosaccharide building blocks. Polysaccharides have a general formula of $C_x(H_2O)_y$ where x is usually a large number between 200 and 2500. Considering that the repeating units in the polymer backbone are often six-carbon monosaccharides, the general formula can also be represented as $(C_6H_{10}O_5)n$ where $40 \leq n \leq 3000$. When all the monosaccharides in a polysaccharide are the same type, the polysaccharide is called a homopolysaccharide or homoglycan, but when more than one type of monosaccharide is present they are called heteropolysaccharides or heteroglycans. Examples include storage polysaccharides such as starch and glycogen, and structural polysaccharides such as cellulose and chitin.

Carboxymethylation of polysaccharides is a widely studied conversion since it is simple and leads to products with a variety of promising properties. In general, the polysaccharide is activated with aqueous alkali hydroxide mostly sodium hydroxide and converted with monochloroacetic acid or its sodium salt according to the Williamson ether synthesis yielding the carboxymethyl (CM) polysaccharide derivative. Various polysaccharides from different sources can be used as starting materials. Exemplary polysaccharides which can be subjected to carboxymethylation include plant polysaccharides such as starch and cellulose, fungal polysaccharides (e.g. pullulan, sclerfoglucan and schizophyllan) and bacterial polysaccharides like dextran and curdlan.

In a preferred embodiment, the CM polysaccharide derivative is obtain from a plant source. More preferably, it is carboxymethyl cellulose (CMC, as it is usually called) or carboxymethyl starch (CMS). CMC was first prepared in 1918 and was produced commercially in the early 1920's. Today CMC of different quality is applied in many areas of industry and human life. Preferably, the CMC is purified to contain less than about 2% salts. Carboxymethyl starch (CMS) is also known for a long time. CMS was first made in 1924 by the reaction of starch in an alkaline solution (40% aqueous NaOH) with sodium monochloroacetate.

Carboxymethylated polysaccharides, in particular CMC and CMS, are based on renewable resources. They are biodegradable and non-toxic products that are finding an increasing number of applications. There are different grades of CMC and CMS. Especially the highly purified products, i.e., of low salt content have made the CM polysaccharides to a valuable additive in many areas of application including the food and pharmaceutical area. CMC is assumed to be applied in more than 200 applications today.

The carboxymethylated starch derivative can be obtained from native, unmodified and chemically modified starch derived from non-genetically modified as well as genetically modified plant variants, such as potato, corn, wheat, tapioca, waxy potato, waxy corn, waxy tapioca, high amylose potato, high amylose corn, and modified starches including low DE maltodextrins and amylomaltase-treated starch. In a preferred embodiment, an adhesive of the invention contains a carboxymethylated potato starch derivative and/or a carboxymethylated corn starch derivative. The starch may be crosslinked or not. The starch may be waxy starch. Very good results were obtained with carboxymethylated crosslinked corn starch, carboxymethylated crosslinked potato starch and carboxymethylated waxy potato starch, all of which are commercially available from various sources. In addition to the carboxymethyl substitution, the polysaccharide may be further modified, for example by hydroxypropylation of the polymer. In one embodiment, the CM polysaccharide is a carboxymethylated, hydroxyl propylated starch, which is optionally crosslinked.

The concentration CM polysaccharide in an adhesive of the invention can vary according to the viscosity of the CM polysaccharide and the desired rheological properties of the solution. It typically ranges between 0.1 and 20% by weight of the total dry weight of the composition. In a preferred embodiment, carboxymethylated polysaccharide is present in an amount of 0.2-10% by weight of the total dry weight of the composition. In one embodiment, CMS or CMC is used at about 0.5-5% w %.

To obtain the highly branched starch for use in the present invention, starch is gelatinized and then converted with a thermostable glycogen branching enzyme (E.C. 2.4.1.18). Normal starch is composed of two constituents, the virtually linear amylose having α-1,4 glycosidic linkages and the α-1,6 branched amylopectin. There are also variants of starch with almost exclusively amylopectin (waxy starches) or starch containing a high amylose amount. Branching enzymes are enzymes capable of converting the α-1,4 glycosidic linkages present in amylopectin and amylose to α-1,6 bonds, thereby creating new branch points. When incubated with gelatinized starch, the amylose and/or long side chains of the amylopectin are transferred to amylopectin with the creation of new α-1,6 glycosidic linkages. This results in a shortening of the average side chain length and a significant reduction of the interaction capacity of the branched molecules. The resulting starch derivative is not hydrolysed to a significant degree as indicated by the fact that it has no measurable reducing power/Dextrose Equivalent (DE). Branching enzyme-modified starch combines a number of already known functional properties (low viscosity at high concentrations, no retrogradation and a transparent solution) with some unexpected functional properties that are beneficial for use as a PVAc substitute, being that it gives no misting or splashing and that it has a sufficient high wet tack.

Accordingly, the invention provides the use of a highly branched starch (HBS) obtained by treatment of starch or starch derivatives with glycogen branching enzyme (EC 2.4.1.18) as binder in combination with a carboxymethylated polysaccharide as rheology-modifying additive in a water-based dispersion adhesive composition. Preferably, the binder is used in a plasticizer-free adhesive, in particular as alternative for polyvinylacetate (PVAc). The degree of branching can vary and may depend on the intended application. Typically, the HBS has a molecular branching degree of at least 4%, preferably at least 5%. Further additives may be included to enhance product stability. In one embodiment, the HBS has a molecular branching degree of at least 6%. This provides a highly stable product. Preferably, it is at least 6.5%, for example in the range of about 7 to about 10%. The degree of molecular branching as used herein refers to the relative amount of α-1,6 glycosidic linkages over the total of α-1,6 and α-1,4 glycosidic linkages ((α-1,6/(α-1,6 +α-1,4) *100%) and can be determined by methods known in the art, e.g. using a combination of reducing end determination/isoamylolysis (Palomo M et al. 2009 Appl. Environm. Microbiology, 75, 1355-1362; Thiemann, V. et al, 2006 Appl. Microb. and Biotechn. 72: 60-71) and measuring the total amount of carbohydrate present via the Anthrone/ sulphuric acid method (see e.g. Fales, F. 1951 J. Biol. Chem. 193: 113-124). Typically, the degree of branching does not exceed 11-12%.

Any native or unmodified starch may be used as starting material for obtaining the HBS for use in the present invention. For example, the highly branched derivative can be derived from non-GMO as well as GMO plant variants of various sources, such as potato, corn, wheat, tapioca, waxy potato, waxy corn, waxy tapioca, high amylose potato, high amylose corn etc. In one embodiment, potato starch is used.

In addition, modified starches are suitable to be used including low DE maltodextrins or amylomaltase-trated starch (e.g. Etenia). In one embodiment, the starch derivative is alpha-amylase treated starch. Also encompassed are chemically modified starches. For example, the starting material is a starch derivative selected from the group consisting of the products of acid or enzymatic hydrolysis of starch and the products of the chemical and physical modifications of starch of any type.

Preferably, the starch or starch derivative is first gelatinized before it is brought into contact with the branching enzyme. Starch gelatinization is a process that breaks down the intermolecular bonds of starch molecules in the presence of water and heat, allowing the hydrogen bonding sites (the hydroxyl hydrogen and oxygen) to engage more water. This irreversibly dissolves the starch granule. Penetration of water increases randomness in the general granule structure and decreases the number and size of crystalline regions.

The gelatinization temperature of starch depends upon botanical source and the amount of water present, pH, types and concentration of salt, sugar, fat and protein in the recipe, as well as derivatisation technology used. Some types of unmodified native starches start swelling at 55° C., other types at 85° C.

For example, starch is gelatinized in a batch or continuous process in a steam injection device (jet cooker). The gelatinized starch can be brought at the desired pH by the addition of acid or base and after the desired temperature has been reached the branching enzyme is added and the solution is kept at the desired temperature for a desired period of time. Alternatively, the branching enzyme can be added to a starch suspension at room temperature and while mixing the slurry is heated to the desired temperature and kept at that temperature for the desired period of time.

The branching enzyme can originate from any suitable microbial source. Preferably, it is a thermostable glycogen branching enzyme obtained from a mesophilic or thermophilic organism, preferably glycogen branching enzyme of *Aquifex aeolicus, Anaerobranca gottschalkii* or *Rhodothermus obamensis*. The enzyme may be produced recombinantly using conventional molecular biological and protein expression techniques.

The conversion conditions and the amount of enzyme added vary widely depending on the starting material, the type of enzyme used and desired extent of conversion. The skilled person will be able to determine suitable conditions by routine trial and error. For example, 1000 enzyme units per gram of dry matter starch can yield 10% branching during an incubation period of about 20 hours. After the conversion has progressed to the desired extent, the enzyme can be inactivated by increasing the temperature or by lowering the pH of the incubation mixture. This can then be followed by a filtration and ion exchange step to remove protein. Subsequently, the pH is adjusted to the desired pH and starch mixture is subjected to drying e.g spray drying or evaporation to remove water and produce a high dry solid mixture.

As said, the highly branched starch derivative finds its use as binder in water-based adhesives. Because of its low viscosity even at high dry solid content, it can be incorporated in the adhesive composition in relatively high amounts, even up to 100% by weight of the total weight of the composition, for example up to 99 w%, up to 98 w %, up to 97 w %, up to 95 w % or up to 90 w %. Hence, the branched starch derivative allows for the production of adhesive compositions having a high dry matter content. Typically, the composition contains 20-80 wt %, preferably 30-60 wt % dry matter. The composition may comprise one or more further useful ingredients, preferably selected from other starches or starch derivatives; filler materials such as chalk ($CaCO_3$) and/or China Clay; and dispersing agents. In one embodiment, HBS is present in an amount of from 1 to 90%, like 5 to 75%, preferably 10 to 60% by weight of the total weight of the formulation.

As discussed herein above, HBS-solutions disclosed in the art have a Newtonian character. This is clearly illustrated in Example 2 wherein adhesive compositions based on the teaching of US 2012/0121873 are investigated. Among others, the viscosity was tested at a shear rate interval of 1-1000 second$^{-1}$. HBS prepared from potato starch or waxy corn starch used at about 50% refraction yielded adhesives with a viscosity index of about 1, indicating that the viscosity was essentially not affected by the shear rate (Newtonian behaviour solution). See table 1.

In contrast, the viscosity of an adhesive comprising HBS was strongly reduced with increasing shear rates upon the addition of a low amount of CM polysaccharide. See Example 3 and Table 2, showing that in the presence of carboxymethyl cellulose the viscosity at shear rate of 10 s-1 is reduced by a factor of 2.3 to 5.9 when the shear rate is increased to 500 s-1, and even more than 7-fold at a shear rate of 1000 s-1. Other types of cellulose ethers (e.g. hydroxypropyl methyl cellulose, hydroxyethyl cellulose or hydroxyethyl methyl cellulose) were either incompatible with HBS as evidenced by a phase separation and/or did not confer a non-Newtonian rheology.

Example 3 shows the screening of twenty different starch derivatives for their effects on rheological behaviour and the compatibility with HBS. As can be concluded from the results shown in Table 4, also for starch-based polysaccharides, the presence of carboxymethyl groups is important to confer a shear-thinning rheology and/or viscosity stability to a HBS-based adhesive. This is confirmed in Example 4 showing some exemplary shear-thinning HBS-based adhesives.

Thus, the invention provides a starch-based adhesive having a shear-thinning rheological behavior. In one embodiment, the viscosity shear rate index is at least 1.2, wherein the viscosity shear rate index is calculated by the quotient of the viscosity at a shear rate of 10 s-1 and the viscosity at a shear rate of 500 s-1 (viscosity index shear rate 10/500) or the viscosity at a shear rate of 10 s-1 and the viscosity at a shear rate of 1000 s-1 (viscosity index shear rate 10/1000) wherein the viscosity is measured at a temperature of 25° C. Preferably, the viscosity shear rate index is at least 1.3, more preferably at least 1.4 or even higher like about 1.5. In a specific aspect, the invention provides an adhesive comprising HBS and a CM starch derivative and having a viscosity shear rate index in the range of about 1.25 to about 1.45. In another specific aspect, the invention provides an adhesive comprising HBS and CM cellulose and having a viscosity shear rate index in the range of about 2.0 to 6.0.

The wet tack is another important parameter for adhesive compositions. Wet tack is the immediate bonding power of an adhesive, still in wet state, that allows it to stick to a substrate instantly once it is applied. The higher the wet tack, the higher the bonding power. If the wet tack of the glue is too low, the paper is insufficiently held together in the wet, non-set state. It was found that the combined use of HBS and a CM polysaccharide confers a shear-thinning rheology and a high wet tack over a range of conventionally used amounts of liquid adhesive applied (20-80 μm).

Also provided is a method for preparing an adhesive composition comprising a branched starch with a viscosity shear rate index of more than or equal to 1.2, comprising mixing enzymatically branched starch with water and at least one carboxymethylated polysaccharide. The dry components were mixed and dissolved in demineralised water at 25° C. during stirring at 1000 rpm for 30 minutes. And thereafter defoamed at 25° C. by stirring at 5 rpm for 30 minutes.

A still further aspect of the invention relates to a method for adhering a first substrate to a second substrate, comprising applying to at least said first or said second substrate a water-based adhesive as disclosed herein. Typically, at least one of said substrates is a paper or wood substrate.

In one embodiment, the first and/or second substrate is/are part of a glued or glueable product. Also provided is a method for gluing a product, comprising the steps of providing an adhesive composition comprising HBS and a CM polysaccharide as disclosed herein, and applying the composition onto a side of a product to be glued. This may take place by roller application, nozzle application, spray application, foam application, cliché application, via anilox application rolls, by a dipping method, by doctoring, etc. A further side to be glued is then fixed on the applied glue to form a rigid bond (after setting or drying of the glue). Exemplary products include paper sacks, paper bags, envelopes, wall paper, gummed tape, spiral and convolute paper tubes and use as a remoistable adhesive. Also encompassed is a glued or glueable product obtainable by an adhering or gluing method according to the invention, the product being characterized in that it contains HBS-based adhesive comprising at least one CM polysaccharide. The glued product normally contains two sides which have been glued together as well as one or two layers of paper or cardboard which are bonded by the glue according to the invention, in particular wherein one layer has a printed or printable flat surface, in particular on a side of the layer opposite the side to glued. Logically, the display surface itself is not glued.

Further embodiments of the invention include methods of using glue, comprising providing a glue composition comprising HBS and a CM polysaccharide additive as described herein, and using the glue composition as a gluing agent or a laminating agent for at least one of paper products, cardboard products and displays made from paper or cardboard.

In a specific aspect, the HBS-based adhesive is used in a method for laminating, for example wherein said laminating comprises litholaminating, off line paper to paper or paper to board or board to board laminating, graphic board laminating, solid board laminating, honeycomb laminating, aluminum foil laminating or duplex wall paper laminating. Laminated substrates obtainable by a laminating method of the invention are also provided.

LEGEND TO THE FIGURES

FIG. 1: Shear rate versus Normal stress analysis of an adhesive composition (1) of the prior art comprising fully gelatinised starch (FGS) versus an adhesion composition (2) of the invention comprising highly branched starch (HBS). For details see Example 7.

Figure 2:
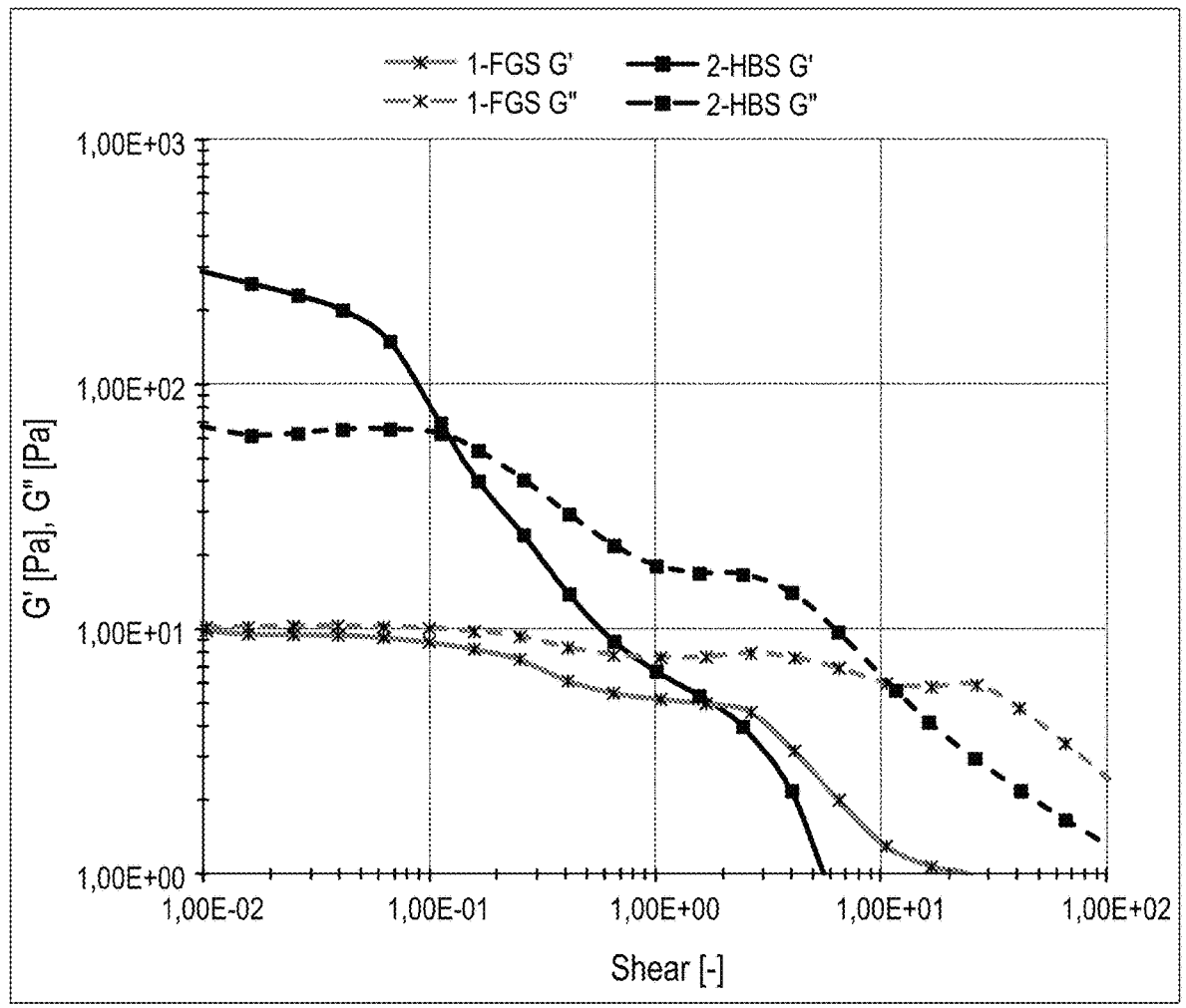

FIG. 2: Large Amplitude oscillatory shear (LAOS) analysis of an adhesive composition (1) of the prior art comprising fully gelatinised starch (FGS) versus an adhesion composition (2) of the invention comprising highly branched starch (HBS). Shown are the storage modulus (G') and the loss modulus (G"). For details see Example 7.

Figure 3:
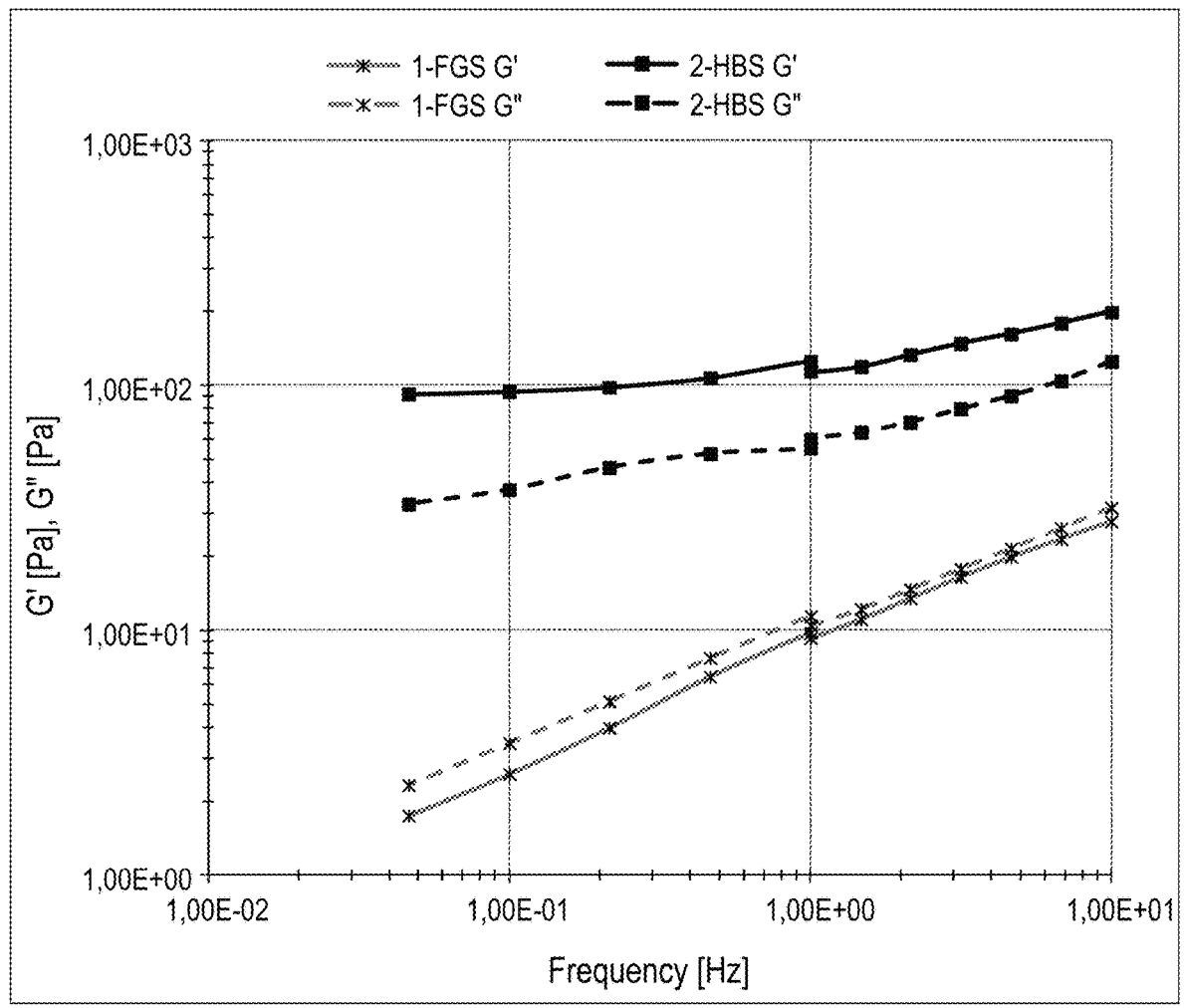

FIG. 3: Oscillation Frequency Sweep analysis of an adhesive composition (1) of the prior art comprising fully gelatinised starch (FGS) versus an adhesion composition (2)

of the invention comprising highly branched starch (HBS). Shown are the storage modulus (G') and the loss modulus (G"). For details see Example 7.

EXPERIMENTAL SECTION

Example 1

Preparation of Highly Branched Starch (HBS)

HBS was produced by jet cooking. A 17% dry solid potato starch slurry was jet cooked (149-153° C., 8 min residence time, pressure 4 bar). After cooling down to 70° C. and adjusting the pH to 6.1, 1000 units of branching enzyme (measured as the change in the absorbance of a iodine/iodide starch complex at 660 nm) were added per gram dry substance of starch. The branching enzyme used was the product NS28067 of Novozymes, a pilot plant product containing the branching enzyme of *Rhodothermus obamensis*.

After 20 h of incubation, the enzyme was inactivated by lowering the pH to 2.5 with 4M HCl. After 35 min the pH was readjusted to 4.5. Then the solution was filtered over a filter with pore size of 2-4 micrometer, followed by ion-exchange (Aquadem E200. Kruger). Finally, the solution was dried by evaporation of the water first at 61° C. and then spray dried at 200° C. (temp out 82° C.). This yielded starch having a degree of branching of 10%.

The activity of the branching enzyme is determined by monitoring changes in the iodine/iodide/amylose complex as a result of the branching enzyme activity. A substrate solution is prepared by adding 10 mg Amylose type III (Sigma) to 0.5 ml 2 M NaOH, subsequently adding 1 ml ultra pure water and then adjusting the pH by adding 0.5 ml 2 M HCl and 7.8 ml phosphate buffer (pH 7.2). A iodine/iodide stock solution is prepared by adding 0.26 g $I_2$ and 2.6 g KI to 10 ml ultra pure water. To 100 microliter of this stock solution 50 microliter 2 M HCl is added and 26 ml ultra pure water (stop reagent). The activity of the enzyme is determined by mixing 50 microliter of appropriately diluted enzyme to 50 microliter of amylose substrate solution and incubation this for 30 min at 60° C. Then 2 ml of stop reagent is added and after mixing well the absorbance is measured at 660 nm (the absorbance should be between 0.15 and 0.3). The activity (U/mL) is calculated using the following formula:

$$U/ml=(OD\text{reference}-OD\text{sample})\times 100\%\times \text{dilution}/(OD\text{reference}-OD\text{blank})/30 \text{ min}/0.05 \text{ ml}$$

Example 2

Branched Starch-Based Adhesive Compositions and their Properties

This reference example shows the Newtonian behaviour of known HBS-based adhesives.

Four different types of HBS were prepared. HBS-P denotes highly branched potato starch obtained as described in Example 1 herein above. HBS-WM1 denotes a liquid highly branched waxy maize starch preparation obtained according to Example 1 of US2012/0121873. Since the drying method is not specified in US2012/0121873, two different dried waxy maize preparations were made. HBS-WM2 refers to HBS-WM1 dried using a Compact Anhydro DanMark spray drier operated at an inlet temperature of 250° C. and an outlet temperature of 110° C.

HBS-WM3 was produced as follows. A 18% dry solid waxy maize slurry was jet cooked at 160° C. After cooling to 70° C. and adjusting the pH to 6.2, 1000 units of branching enzyme (measured as the change in the absorbance of a iodine/iodide starch complex at 660 nm) were added per gram dry substance of starch. The branching enzyme used was product NS28067 of Novozymes. After a 19 h incubation, the enzyme was inactivated by lowering the pH to 2.7 with 10% HCl. After 30 min the pH was readjusted to 4.5 with 10% NaOH. The solution was then filtered over a filter with pore size of 8-12 micrometer, followed by mixed ion-exchange (AMBERLITE™ MB20 Resin) chromatography. Finally the solution was spray dried (250° C. to 110° C. on a Compact Anhydro DanMark spray drier). This yielded starch having a degree of branching of 10%. Each of the HBS preparations was dissolved by adding the product in about 10 seconds (in a steady flow) to demineralised water (25±1° C.) in a plastic beaker (Ø90 mm), while being stirred at 1000 rpm with a 3-propeller stirrer (Ø60 mm) for 30 minutes. After defoaming (30 min. 5 rpm), the adhesive compositions were brought onto a refraction of 50%.

Brookfield viscosity—The viscosity of the solution (20±1° C.) is determined with a digital Brookfield DV-I viscosimeter (mPa·s) using the correct applicable spindle at 20 rpm during 15 seconds (or five revolutions)

Stability—For determining the viscostability of the liquid adhesive solution, the solution is preserved by addition of 0.1% Proxel BZ plus from Lonza and stored at 20±1° C. during a certain period and every few days the viscosity the solution (20±1° C.) is registered.

Adhesion—Wet tack—The wet tack of the adhesive solution is determined with a Fipago-Adhesion tester (PKL system) in a conditioned room (RH=50±2%, T=23±1° C.). A thin adhesive film (standard 60 μm) of liquid adhesive (23±1° C.) is applied with a wire winded rod on the smooth side of a standard kraft paper stripe (Natural machine-glazed kraft paper (one smooth and shiny side, one matt side) Manufacterer: Sopal Doetinchem, The Netherlands; Gurley porosity: 72 s; PPS smoothness (smooth side): 3.42 μm; $Cobb^{60}$: 24 $g/m^2$; Grammage: 85 $g/m^2$; Dennison wax test: 18; 30×200 mm). After the open time is exceeded (standard 5 s) the glued paper strip is placed on another piece of paper (kraftliner Pitea Royal Brown, Manufacterer: Kappa Smurfit, Sweden; Supplier: Fipago, The Netherlands (Fipago 2006 kraftline); Grammage: 200 $g/m^2$; $Cobb^{1800}$: 86 $g/m^2$; Dennison wax test: 18; 60×100 mm) by means of a metal pressure roller (standard 500 g). After the close time is exceeded (standard 3 s) the two pieces of paper are separated from each other. The wet tack is given as work (cJ) needed to separate the pieces of paper is measured.

Adhesion—Setting time—For determining the setting time of the adhesive the above method for determining the wet tack is followed, where as the open time is set on 0 seconds and the closed time is varied (standard in the interval 0 . . . 20 seconds, but can be longer if fibre tear has not yet occurred). Every adhesive is characterized by at least five different closed times, yielding a more or less sigmoid curve. This curve represents the work needed to overcome the bond strength as function of closed time. Results are given as work (cJ). The value for the setting time (s) is the time where the peel strength of 40 cJ is exceeded.

Rheology—A flow curve of an adhesive is recorded by a Physica Rheolab MC 100 Rheometer. 1.5 ml adhesive under cone and plate MK 22, gap: 0.05 mm, Temperature: 25° C.

Profile:
1$^{st}$ interval:. Shear rate ramp log: 0.1 ... 1000 s$^{-1}$: 30 points 6 s (180 s)
2$^{nd}$ interval:. Shear rate: 1000 s$^{-1}$: 10 points 6 s (60 s)
3$^{rd}$ interval:. Shear rate ramp log: 1000 ... 0.1 s$^{-1}$ 30 points 6 s (180 s)

Depending on resistance of the liquid, the maximum of 1000 s$^1$ is sometimes not reached (maximum torque is exceeded).

Compatibility: 100 ml of the adhesive is stored in a well closed glass jar at 20° C. The adhesive is evaluated 1 day and 1 week after preparation. Incompatibility can be recognized by the appearance of two layers or a buttermilk structure at the wall of the glass jar. Compatibility is indicated with +, incompatibility is indicated with −.

Table 1 shows the various properties of the compositions.

|  | Composition | | | |
| --- | --- | --- | --- | --- |
|  | 1 | 2 | 3 | 4 |
| HBS-P | 100 g | | | |
| HBS-WM 1 | | 165 g | | |
| HBS-WM 2 | | | 100 g | |
| HBS-WM 3 | | | | 100 g |
| water | 100 g | 35 g | 100 g | 100 g |
| Properties: | | | | |
| Brookfield viscosity [mPa · s] 20 rpm, 20° C. | | | | |
| 1 day after preparation | 3150 | 2860 | 2850 | 4530 |
| Refraction [%] | 49.7 | 50.0 | 49.9 | 49.9 |
| pH | 4.16 | 1.68 | 1.80 | 5.98 |
| Appearance | transparant | transparant | transparant | transparant |
| Wet Tack 60 μm [5.3] | 5 | 5.5 | 5 | 9.7 |
| Setting time 60 μm Time till 40 cJ | 12.5 | 12.5 | 11.5 | 9.5 |
| Rheology Physical viscosity [mPa · s] | | | | |
| Interval 1-1000 | | | | |
| Shear rate 10 s−1 | 1910 | 1919 | 1970 | 3018 |
| Shear rate 500 s−1 | 1912 | 1854 | 1812 | 2802 |
| Viscosity index | | | | |
| Shear rate 10/500 | 1.00 | 1.03 | 1.09 | 1.08 |

The above results demonstrate that HBS originating from potato or waxy maize both show a Newtonian behaviour.

Example 3

Water-Based Adhesive Compositions comprising HBS and CM polysaccharide

This example describes the effects of cellulose derivatives on the rheology of a HBS-containing adhesive composition. The HBS was prepared from potato starch as described in Example 1. Five different cellulose ethers were tested. Methocel 254 is a HPMC (hydroxypropylmethylcellulose) from Dow Chemicals. Natrosol 250 HR is a HEC (hydroxyethyl cellulose) from Ashland. Gabrosa P200G is a CMC (carboxymethylcellulose) from AkzoNobel. Klucel HIND is a HPC (hydroxypropylcellulose) from.Ashland. Walocell MKX 40000 PF01 is a HEMC (hydroxyethylmethylcellulose) from Dow Chemicals. The components were mixed and dissolved in demineralised water at 25° C. during stirring at 1000 rpm for 30 minutes. And thereafter defoamed at 25° C. by stirring at 5 rpm for 30 minutes. Table 2 below shows the composition and properties of the adhesive compositions.

TABLE 2

Screening of applicability of various cellulose ethers as rheology-modifying additive.

|  | HBS-CE | | | | | |
| --- | --- | --- | --- | --- | --- | --- |
| Composition | 1 | 2 | 3 | 4 | 5 | 6 |
| HBS[3] | 34.3 g | 34.3 g | 34.3 g | 34.3 g | 34.3 g | 34.3 g |
| water | 48.3 g | 48.3 g | 48.3 g | 48.3 g | 48.3 g | 48.3 g |
| HPMC |  | 0.8 g |  |  |  |  |
| HEC |  |  | 0.8 g |  |  |  |
| CMC |  |  |  | 0.2 g |  |  |
| HPC |  |  |  |  | 0.8 g |  |
| HEMC |  |  |  |  |  | 0.8 g |
| Color | transparant | Transparant | Transparant | transparant | Transparant | Transparant |
| Properties: | | | | | | |
| Brookfield viscosity [mPa · s] 20 rpm. 20° C., | | | | | | |
| 1 day after preparation | 500 | 940 [4] | 980 [4] | 1700 | 600 [4] | 780 [4] |
| Refraction [%] | 41.5 | 43.9 | 43.4 | 41.3 | 42.3 | 42.7 |
| Compatible with HBS | n.a. | −[1] | −[1] | + | ±[2] | −[1] |
| Rheological behavior | Newtonian | n.a. | n.a. | Shear-thinning | Newtonian | n.a. |
| Physica viscosity [mPa · s] | | | | | | |
| Interval 1-1000 | | | | | | |
| Shear rate 10 s−1 | 401 |  |  | 1051 | 522 |  |
| Shear rate 500 s−1 | 378 |  |  | 457 | 429 |  |
| Shear rate 1000 s−1 | 381 |  |  | 429 | 428 |  |

TABLE 2-continued

Screening of applicability of various cellulose ethers as rheology-modifying additive.

| | HBS-CE | | | | | |
|---|---|---|---|---|---|---|
| Composition | 1 | 2 | 3 | 4 | 5 | 6 |
| Viscosity index | | | | | | |
| Shear rate 10/500 | 1.06 | | | 2.30 | 1.22 | |
| Shear rate 10/1000 | 1.05 | | | 2.45 | 1.22 | |

[1] Separation of cellulose ether and HBS (top layer cellulose ether, bottom layer HBS) was observed
[2] Turbid mixture
[3] Potato starch based
[4] After homogenization of the mixture As is clear from Table 2, only the adhesive compositions comprising carboxymethylated cellulose (column 4) displayed a good compatibility with HBS and a desirable shear-thinning behavior.

Example 4

Water-Based Adhesive Compositions comprising HBS and Starch

In this example, twenty different starch derivatives were screened at a concentration of 2% by weight of the HBS. Table 4 summarizes their effects on rheological behaviour and the compatibility with HBS.

TABLE 4

Screening of starch derivatives

| Starch source | Modification Chemical | Physical | Rheological behaviour mixture | Compatibility with HBS |
|---|---|---|---|---|
| potato | Acetylated distarch phosphate | Drumdried | Newtonian | − |
| potato | Distarchphospate | Drumdried | Newtonian | − |
| potato | Acetylated distarch phospate | Drumdried | Newtonian | − |
| potato | Distarch phospate (+emulsifier) | Drumdried | Newtonian | − |
| potato | Hydroxypropylation | Spray cooked | Newtonian | − |
| potato | Acetylated distarch adipate | Drumdried | Newtonian | ± |
| waxy potato | | Extruded | Newtonian | ± |
| potato | Hydroxypropylated distarch phosphate | Drumdried | Newtonian | ± |
| potato | Hydroxypropylation | | Newtonian | ± |
| potato | Oxidization | Drumdried | Newtonian | ± |
| potato | Sodium octenyl succinate | Drumdried | Newtonian | ± |
| potato | Acid degraded (+Na-3) | Drumdried | Newtonian | ± |
| wheat | | Drumdried | Newtonian | + |
| waxy potato | Peroxide degraded (+filler) | Drumdried | Newtonian | + |
| potato | Oxidization and hydroxyethylation | | Newtonian | + |
| maize | Carboxymethylated and crosslinked | Drumdried | Shearthinning | + |
| potato | Carboxymethylated | Extruded | Shearthinning | + |
| waxy potato | Carboxymethylated | Extruded | Shearthinning | + |
| potato | Carboxymethylated, hydroxypropylated and crosslinked | Drumdried | Shearthinning | + |
| potato | Carboxymethylated and crosslinked | Drumdried | Shearthinning | + |

The results shown in Table 4 demonstrate that, also for starch-based polysaccharides, the presence of carboxymethyl groups is important to confer a shear-thinning rheology and/or compatibility to a HBS-based adhesive.

Example 5

Exemplary Shear-Thinning HBS-Based Adhesives

TABLE 5

|  | Composition: | | |
| --- | --- | --- | --- |
|  | 1 | 2 | 3 |
| HBS | 245 g | 245 g | 245 g |
| SOLVITOSE C5 | — | 2.5 g | — |
| QUICKSOLAN SPR | — | — | 5.0 g |
| Water | 345 g | 345 g | 345 g |
| Properties: | | | |
| Brookfield viscosity [mPa · s] 20 rpm, 20° C., | | | |
| 2 h after preparation | 570 | 1170 | 1355 |
| Refraction [%] | 41.3 | 41.6 | 41.9 |
| pH | 5.4 | 5.8 | 5.2 |
| Wet Tack 60 μm [5.3] | 2 | 2.75 | 3 |
| Setting time 60 μm [Time till 40 cJ [s] | 16 | 15.5 | 15 |
| Viscosity-stability Brookfield viscosity [mPa · s] 20 rpm, 20° C. | | | |
| After 2 hours | 515 | 1075 | 1340 |
| After 4 weeks | 585 | 1220 | 1365 |
| Viscosity-stability index | | | |
| [4 weeks/2 hours] | 1.14 | 1.13 | 1.02 |
| Rheological behavior | Newtonian | Shear-thinning | Shear-thinning |
| Physical viscosity [mPa · s] Interval 0.1-1000 | | | |
| Shear rate 10 s−1 | 443 | 988 | 963 |
| Shear rate 500 s−1 | 440 | 741 | 710 |
| Shear rate 1000 s−1 | 441 | 713 | 683 |
| Viscosity index | | | |
| Shear rate 10/500 | 1.01 | 1.33 | 1.36 |
| Shear rate 10/1000 | 1.00 | 1.39 | 1.41 |

The results in Table 5 demonstrates that addition of the CM-polysaccharides Solvitose C5 or Quicksolan SPR to HBS results in the desired rheological behavior without sacrificing the relevant adhesive properties like wet tack, setting speed and stability.

Example 6

Various Types and Dosages of CM Polysaccharide Show the Beneficial Rheological Effect This example further demonstrates the effect of type and dosage (based on dry weight) of carboxymethyl polysaccharide. The carboxymethyl polysaccharides tested were Solvitose C5 (CM potato starch from AVEBE), Quicksolan SPR (CM amylopectin potato starch from AVEBE), Gabrosa T 4000 C (CM cellulose from AKZO NOBEL) and Finnfix 2 (CM cellulose from Metsa-Serla).

All compositions with carboxymethyl polysaccharide derivative additions result in the desired rheological behaviour while relevant adhesive properties like wet tack, setting speed and stability were retained or even improved. By using different types and/or dosages of carboxymethyl polysaccharides, the adhesive properties (viscosity, rheology, wet tack and setting speed) can be optimized to the specific demands of the various possible applications.

TABLE 6A

Solvitose C5 in the range of 1.0 to 3.9 w %

|  | Composition: | | | |
| --- | --- | --- | --- | --- |
|  | 1 | 2 | 3 | 4 |
| HBS | 245 g | 245 g | 245 g | 245 g |
| SOLVITOSE C5 | — | 2.5 g | 5 g | 10 g |
| Water | 345 g | 345 g | 345 g | 345 g |
| Properties: | | | | |
| Brookfield viscosity [mPa · s] 20 rpm, 20° C., | | | | |
| 2 h after preparation | 570 | 1005 | 2315 | 8580 |
| Refraction [%] | 41.3 | 42.1 | 42.3 | 43.0 |
| pH | 5.4 | 5.4 | 5.7 | 6.1 |
| Wet Tack 60 μm [5.3] | 2 | 3 | 4 | 7 |
| Setting time 60 μm [0, . . .] | | | | |
| Time till 40 cJ [s] | 16 | 16.5 | 16.5 | 16.5 |
| Viscosity-stability Brookfield viscosity [mPa · s] 20 rpm, 20 ° C. | | | | |
| After 2 hours | 515 | 1005 | 2315 | 8580 |
| After 4 weeks | 585 | 1200 | 2425 | 8950 |
| Viscosity-stability index | | | | |
| [4 weeks/2 hours] | 1.14 | 1.19 | 1.05 | 1.04 |
| Rheological behavior | Newtonian | Shear-thinning | Shear-thinning | Shear-thinning |
| Physical viscosity [mPa · s] Interval 0.1-1000 | | | | |
| Shear rate 10 s−1 | 443 | 842 | 1834 | 5499 |
| Shear rate 500 s−1 | 440 | 688 | 1096 | 2120 |
| Shear rate 1000 s−1 | 441 | 658 | 1002 | 1778 |
| Viscosity index | | | | |
| Shear rate 10/500 | 1.01 | 1.22 | 1.67 | 2.59 |
| Shear rate 10/1000 | 1.00 | 1.28 | 1.83 | 3.09 |

TABLE 6B

Quicksolan SPR in the range of 3.9 to 9.3 w %

|  | Composition: | | | | |
| --- | --- | --- | --- | --- | --- |
|  | 1 | 2 | 3 | 4 | 5 |
| HBS | 245 g | 245 g | 245 g | 245 g | 245 g |
| QUICKSOLAN SPR | — | 10 g | 15 g | 20 g | 25 g |
| Water | 345 g | 345 g | 345 g | 345 g | 345 g |
| Properties: | | | | | |
| Brookfield viscosity [mPa · s] 20 rpm, 20° C., | | | | | |
| 2 h after preparation | 570 | 2615 | 4100 | 5670 | 7260 |
| Refraction [%] | 41.3 | 43 | 43.4 | 43.9 | 44.1 |

TABLE 6B-continued

Quicksolan SPR in the range of 3.9 to 9.3 w %

| Composition: | 1 | 2 | 3 | 4 | 5 |
|---|---|---|---|---|---|
| pH | 5.4 | 5.63 | 5.82 | 5.98 | 6.13 |
| Wet Tack 60 μm [5.3] | 2 | 6 | 9 | 11 | 12 |
| Setting time 60 μm [0, . . .] | | | | | |
| Time till 40 cJ [s] | 16 | 14 | 14 | 14 | 13 |
| Viscosity-stability | | | | | |
| Brookfield viscosity [mPa · s] 20 rpm, 20° C. | | | | | |
| After 2 hours | 515 | 2615 | 4100 | 5670 | 7260 |
| After 4 weeks | 585 | 2580 | 3960 | 5590 | 7080 |
| Viscosity-stability index [4 weeks/2 hours] | 1.14 | 0.99 | 0.97 | 0.99 | 0.98 |
| Rheological behavior | Newtonian | Shear-thinning | Shear-thinning | Shear-thinning | Shear-thinning |
| Physical viscosity [mPa · s] Interval 0.1-1000 | | | | | |
| Shear rate 10 s−1 | 443 | 1866 | 2649 | 3822 | 4712 |
| Shear rate 500 s−1 | 440 | 932 | 1215 | 1580 | 1867 |
| Shear rate 1000 s−1 | 441 | 860 | 1100 | 1402 | 1655 |
| Viscosity index | | | | | |
| Shear rate 10/500 | 1.01 | 2.00 | 2.18 | 2.42 | 2.52 |
| Shear rate 10/1000 | 1.00 | 2.17 | 2.41 | 2.73 | 2.85 |

TABLE 6C

Gabrosa T 4000 C in the range of 0.1 to 2.0 w %

| Composition: | 1 | 2 | 3 | 4 | 5 |
|---|---|---|---|---|---|
| HBS | 245 g | 245 g | 245 g | 245 g | 245 g |
| GABROSA T 4000 C | — | 0.25 g | 1 g | 2.5 g | 5 g |
| Water | 345 g | 345 g | 345 g | 345 g | 345 g |
| Properties: | | | | | |
| Brookfield viscosity [mPa · s] 20 rpm, 20° C., | | | | | |
| 2 h after preparation | 570 | 650 | 1190 | 2900 | 8800 |
| Refraction [%] | 41.3 | 42.3 | 42.5 | 42.2 | 42.2 |
| pH | 5.4 | 5.2 | 5.2 | 5.3 | 5.4 |
| Wet Tack 60 μm [5.3] | 2 | 4 | 7 | 18 | 27 |
| Setting time 60 μm [0, . . .] | | | | | |
| Time till 40 cJ [s] | 16 | 16.5 | 14.5 | 13.5 | 10 |
| Viscosity-stability | | | | | |
| Brookfield viscosity [mPa · s] 20 rpm, 20 ° C. | | | | | |
| After 2 hours | 515 | 650 | 1190 | 2900 | 8800 |
| After 4 weeks | 585 | 795 | 1515 | 3740 | 10780 |
| Viscosity-stability index [4 weeks/2 hours] | 1.14 | 1.22 | 1.27 | 1.29 | 1.23 |
| Rheological behavior | Newtonian | Shear-thinning | Shear-thinning | Shear-thinning | Shear-thinning |
| Physica viscosity [mPa · s] Interval 0.1-1000 | | | | | |
| Shear rate 10 s−1 | 443 | 522 | 1244 | 1986 | 3910 |
| Shear rate 500 s−1 | 440 | 448 | 543 | 700 | 943 |
| Shear rate 1000 s−1 | 441 | 439 | 505 | 627 | 811 |

TABLE 6C-continued

Gabrosa T 4000 C in the range of 0.1 to 2.0 w %

| Composition: | 1 | 2 | 3 | 4 | 5 |
|---|---|---|---|---|---|
| Viscosity index | | | | | |
| Shear rate 10/500 | 1.01 | 1.16 | 2.29 | 2.84 | 4.15 |
| Shear rate 10/1000 | 1.00 | 1.19 | 2.46 | 3.17 | 4.82 |

TABLE 6D

Finnfix 2 in the range of 7.5 to 16.9 w %

| Composition: | 1 | 2 | 3 | 4 | 5 |
|---|---|---|---|---|---|
| HBS | 245 g | 245 g | 245 g | 245 g | 245 g |
| FINNFIX 2 | — | 20 g | 30 g | 40 g | 50 g |
| Water | 345 g | 345 g | 345 g | 345 g | 345 g |
| Properties: | | | | | |
| Brookfield viscosity [mPa · s] 20 rpm, 20° C., | | | | | |
| 2 h after preparation | 570 | 2175 | 4030 | 7180 | 12300 |
| Refraction [%] | 41.3 | 43.6 | 44.4 | 45.1 | 45.8 |
| pH | 5.4 | 5.5 | 5.6 | 5.6 | 5.6 |
| Wet Tack 60 μm [5.3] | 2 | 4 | 4 | 5 | 6 |
| Setting time 60 μm [0, . . .] | | | | | |
| Time till 40 cJ [s] | 16 | 15 | 16 | 16 | 16 |
| Viscosity-stability | | | | | |
| Brookfield viscosity [mPa · s] 20 rpm, 20 ° C. | | | | | |
| After 2 hours | 515 | 2175 | 4030 | 7180 | 12300 |
| After 4 weeks | 585 | 2270 | 4280 | 7870 | 14600 |
| Viscosity-stability index [4 weeks/2 hours] | 1.14 | 1.04 | 1.06 | 1.10 | 1.19 |
| Rheological behavior | Newtonian | Shear-thinning | Shear-thinning | Shear-thinning | Shear-thinning |
| Physica viscosity [mPa · s] Interval 0.1-1000 | | | | | |
| Shear rate 10 s−1 | 443 | 1656 | 2777 | 4768 | 7948 |
| Shear rate 500 s−1 | 440 | 1296 | 1998 | 2910 | 4355 |
| Shear rate 1000 s−1 | 441 | 1210 | n.a. | n.a. | n.a. |
| Viscosity index | | | | | |
| Shear rate 10/500 | 1.01 | 1.28 | 1.39 | 1.64 | 1.83 |
| Shear rate 10/1000 | 1.00 | 1.37 | n.a. | n.a. | n.a. |

TABLE 6E

Additional example showing the impact of the type of CM polysaccharide used (Brookfield viscosity between 2000-3000 mPa · s).

| Composition: | 1 | 2 | 3 | 4 |
|---|---|---|---|---|
| HBS | 245 g | 245 g | 245 g | 245 g |
| GABROSA T 4000 C | 2.5 g | | | |
| SOLVITOSE C5 | | 5 g | | |
| QUICKSOLAN SPR | | | 10 g | |
| FINNFIX 2 | | | | 20 g |
| Water | 345 g | 345 g | 345 g | 345 g |
| Properties: | | | | |
| Brookfield viscosity [mPa · s] 20 rpm, 20° C., | | | | |
| 2 h after preparation | 2900 | 2315 | 2615 | 2175 |
| Refraction [%] | 42.2 | 42.3 | 43.0 | 43.6 |

TABLE 6E-continued

Additional example showing the impact of the type of CM polysaccharide used (Brookfield viscosity between 2000-3000 mPa · s).

| Composition: | 1 | 2 | 3 | 4 |
|---|---|---|---|---|
| pH | 5.3 | 5.7 | 5.6 | 5.5 |
| Wet Tack 60 μm [5.3] | 18 | 4 | 6 | 4 |
| Setting time 60 μm [0, . . .] | | | | |
| Time till 40 cJ [s] | 13.5 | 16.5 | 14 | 15 |
| Viscosity-stability | | | | |
| Brookfield viscosity | | | | |
| [mPa · s] | | | | |
| 20 rpm, 20° C. | | | | |
| After 2 hours | 2900 | 2315 | 2615 | 2175 |
| After 4 weeks | 3740 | 2425 | 2580 | 2270 |
| Viscosity-stability index | | | | |
| [4 weeks/2 hours] | 1.29 | 1.05 | 0.99 | 1.04 |
| Rheological behavior | Shear-thinning | Shear-thinning | Shear-thinning | Shear-thinning |
| Physical viscosity | | | | |
| [mPa · s] | | | | |
| Interval 0.1-1000 | | | | |
| Shear rate 10 s−1 | 1986 | 1834 | 1866 | 1656 |
| Shear rate 500 s−1 | 700 | 1096 | 932 | 1296 |
| Shear rate 1000 s−1 | 627 | 1002 | 860 | 1210 |
| Viscosity index | | | | |
| Shear rate 10/500 | 2.84 | 1.67 | 2.00 | 1.28 |
| Shear rate 10/1000 | 3.17 | 1.83 | 2.17 | 1.37 |

Example 7

Advantage of HBS Over Other Starch Derivatives

This examples demonstrates the surprising advantages of a composition of the invention comprising HBS and CM polysaccharide over known aqueous starch-based adhesives comprising carboxymethylcellulose. U.S. pat. No. 4,272,295 relates to starch based adhesives, for example, for use in the manufacture of corrugated and laminated paper and board, and in particular to starch based adhesives requiring low heat-energy consumption for forming satisfactory bonds.

Example 1 of U.S. Pat. No. 4,272,295 discloses a lyophilic colloid consisting of 90% by weight of fully gelatinized starch and 10% by weight of carboxymethyl cellulose. The data herein below show that replacement of the fully gelatinized starch with highly branched starch unexpectedly provides an adhesive with completely different properties and an improved rheological profile.

Methods:
1. In a glass beaker of 400 mL 175.7 gram of water and 2.0 gram of caustic soda were added. The beaker was put in a water bath of 55° C.
2. Whilst stirring with 1000 rpm 8.33 gram of a lyophilic colloid consisting of 90% by weight of either fully gelatinised starch (Passeli WA 4; comparative example) or HBS (example of the invention) and 10% by weight of carboxymethyl cellulose (Gabrosa P 400 G) was dispersed into the solution. The mix was stirred for 10 minutes in water bath of 55° C.
3. 133.3 grams of commercial wheat starch was slurried in 200 grams of water and added whilst stirring with 1000 rpm to the colloid solution.
4. The mixture was heated in the water bath of 55° C. until viscosity increased to 28 seconds (STEIN HALL CUP).
5. Immediately the mixture was taken out of the water bath and at room temperature 0.83 gram of Boric Acid was added and after 1 minute mixing 0.33 gram of sodium silicate (38 DEGBe) was added.

After 1 day storage at 20° C. the Brookfield viscosity, pH, dry solids were determined and the rheological profile characterized with a flow curve, LAOS (Large Amplitude Oscillatory Shear) and an Oscillation Frequency Sweep.

Analytic Procedures:
Rheology—A flow curve of an adhesive is recorded by a Haake Mars III Rheometer. Measure geometry: C60/2° Ti L L10 010. gap: 0.100 mm, 2.5 ml adhesive, temperature: 20° C.

Profile:
1. CR; 10.00 1/s; t 30.00 s; #30
2. CR; 0.000 1/s; t 3.00 s; #10;
3. Reset normal force
4. CR; 1.000 1/s-1000. 1/s log; t 160.00 s; #16
5. CR; 1000. 1/s-1.000 1/s log; t 160.00 s; #16

Rheology—A LAOS of an adhesive is recorded by a Haake Mars III Rheometer. Measure geometry: C60/2° Ti L L10 010. gap: 0.100 mm, 2.5 ml adhesive, temperature: 20° C.

Profile:
1. CS; 0.000 Pa; t<300.00 s;
2. CR; 0.000 1/s; t 3.00 s; #10
3. Reset normal force
4. CD; 0.01000-100.0- log; f 1.000 Hz; t - - -; #21
5. CD; 0.01000-100.0- log; f 1.000 Hz; t - - -; #21

Rheology—An oscillation frequency sweep of an adhesive is recorded by a Haake Mars III Rheometer. Measure geometry: C60/2° Ti L L10 010. gap: 0.100 mm, 2.5 ml adhesive, temperature: 20° C.

Profile:
1. CS; 0.000 Pa; t<300.00 s
2. CR; 0.000 1/s; t 3.00 s; #10
3. CD-AS; 0.04000-; 10.00 Hz 1.000 Hz log; t - - -; #6
4. CD-AS; 0.04000-; 1.000 Hz 0.01000 Hz log; t - - -; #3

Results

Table 7 and FIGS. 1, 2 and 3 show that the use of HBS instead of fully gelatinized starch in a lyophilic colloid results in an adhesive with a yielding behaviour which acts like a gel instead of a polymeric solution. A gel-like behaviour is very desirable for adhering two substrates (e.g. at laminating) because due to this behaviour delamination during drying of the adhesive will be avoided or minimized. In contrast, the adhesive with the polymeric solution behaviour continues to flow and will not withstand low load during drying resulting in delamination.

TABLE 7

| Composition | Comp. example | Invention |
|---|---|---|
| Starch in lyophilic colloid | Fully gelatinized starch (FGS) | Highly branched Starch (HBS) |
| Properties: | | |
| Brookfield viscosity | | |
| [mPa · s] | | |
| 20 rpm, 20° C. | | |
| 1 day after preparation | 18350 | 9100 |
| pH | 12.1 | 12.0 |
| Dry solids [%] | 22.6 | 22.7 |
| Rheology HAAKE MARS | | |
| Flowcurve | | |
| [mPa · s] | | |

TABLE 7-continued

| Composition | Comp. example | Invention |
|---|---|---|
| Interval 1-1000 | | |
| Shear rate 10 s−1 | 5300 | 4850 |
| Shear rate 1000 s−1 | 233 | 132 |
| Viscosity index | | |
| Shear rate 10/1000 | 22.7 | 36.7 |
| LAOS [1] | Type I | Type III |

[1] Reference: Large Amplitude oscillatory shear behavior of complex fluids investigated by a network model: a guideline for classification. Hoon Goo Sim, Kyung Hyun Ahn, Seung Jong Lee. Journal of Non-Newtonian Fluid Mechanics, 112 (2003), 237-250

FIGS. 1, 2 and 3 illustrate the rheological properties of the comparative example (Composition 1; FGS) and the example of the invention (Composition 2; HBS).

As is shown in FIG. 1, with the use of HBS (almost) no change in normal stress is observed. In contrast, with Composition 1 a positive normal stress builds up which is known to be undesirable and promotes uneven application of the adhesive due to the formation of ribs. (Reference: Effects of non-newtonian fluids on the ribbing instability. L. Pauchard, F. Varela Lopez, M. Rosen, C. Allain, P. Perrot, M. Rabaud 3rd European Symposium on Advances in Coating and Drying of Thin Films. Erlangen 1999). It was also observed that with the use of HBS an abrupt decrease of the viscosity is observed near a stress of 60 Pascal (yielding behaviour) whereas a composition according to U.S. Pat. No. 4,272,295 shows a gradual decrease of the viscosity (data not shown).

FIG. 2 shows the results of the Large Amplitude Oscillatory Shear (LAOS) analysis, which is useful to characterize nonlinear properties of complex fluids. LAOS characterization is considered as a rigorous test for rheological models and quality control. It was found that comparative Composition 1 with fully gelatinized starch is classified' as a type I, strain thinning. Type I are polymer like solutions and this is in correspondence with the observed Normal stress development. Composition 2 with HBS however is classified [1] as type III, weak strain overshoot. Type III is not as common as type I behaviour, and a Type III response is typical for complex fluids which have a temporary network. Hence, the LAOS analysis also demonstrates a major effect of using HBS on the rheological properties of the colloid. In particular, the Type III behaviour is especially desirable for application of the colloid in (high speed) machinery in the paper industry.

FIG. 3 shows the Oscillation Frequency Sweep. Formulation 2 behaves like a typical gel; the elastic component (G') is almost frequency independent and has a finite magnitude. In contrast, Composition 1 behaves like a polymer like solution; at (very) low frequencies the elastic component vanishes and it will flow like a liquid.

In conclusion, all three characterizations show a distinct difference in rheological behaviour between Compositions 1 and 2. Composition 1 flows like a polymer solution, whereas Composition 2 shows a yielding behaviour and acts like a gel.

One skilled in the art will recognize and appreciate that a gel-like behaviour is very desirable for adhering two substrates (e.g. at laminating) because delamination will be avoided or minimized due to this behaviour.

The invention claimed is:

1. A method for preparing an adhesive composition comprising a branched starch with a viscosity shear rate index of more than or equal to 1.2, wherein the viscosity is measured at a temperature of 25° C., comprising mixing enzymatically branched starch with water and at least one carboxymethylated polysaccharide.

2. A method for adhering a first substrate to a second substrate, comprising applying to at least said first or said second substrate a water-based adhesive composition comprising an aqueous adhesive composition comprising highly branched starch (HBS) obtained by treatment of starch or starch derivatives with a glycogen branching enzyme (EC 2.4.1.18), and further comprising a carboxymethyl (CM) polysaccharide derivative, wherein at least one of said substrates is a paper, glass or wood substrate.

3. Method according to claim 2, wherein said first and/or said second substrate are part of a glued or glueable product, preferably wherein the product is selected from the group consisting of paper sacks, paper bags, envelopes, wall paper, gummed tape, spiral and convolute paper tubes.

4. Method according to claim 2, wherein said adhering comprises laminating, preferably wherein said laminating comprises litholaminating, off line paper to paper or paper to board or board to board laminating, graphic board laminating, solid board laminating, honeycomb laminating, aluminum foil laminating or duplex wall paper laminating.

5. A glued, glueable or laminated product obtainable by a method according to claim 3.

* * * * *